(12) United States Patent
Skinner et al.

(10) Patent No.: US 9,512,717 B2
(45) Date of Patent: Dec. 6, 2016

(54) DOWNHOLE TIME DOMAIN REFLECTOMETRY WITH OPTICAL COMPONENTS

(71) Applicant: Halliburton Energy Services, Inc., Duncan, OK (US)

(72) Inventors: Neal G. Skinner, Lewisville, TX (US); Etienne M. Samson, Cypress, TX (US); David Paul Sharp, Houston, TX (US); John L. Maida, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 469 days.

(21) Appl. No.: 13/655,607

(22) Filed: Oct. 19, 2012

(65) Prior Publication Data
US 2014/0111348 A1   Apr. 24, 2014

(51) Int. Cl.
*G01V 3/00* (2006.01)
*E21B 47/12* (2012.01)
*H04B 10/071* (2013.01)
*H04B 13/02* (2006.01)
*G01D 5/353* (2006.01)

(52) U.S. Cl.
CPC .......... *E21B 47/123* (2013.01); *H04B 10/071* (2013.01); *H04B 13/02* (2013.01); *G01D 5/35358* (2013.01)

(58) Field of Classification Search
USPC ...................................................... 340/854.7
See application file for complete search history.

(56) References Cited

U.S. PATENT DOCUMENTS

| | | | |
|---|---|---|---|
| 4,867,776 | A | 9/1989 | Sharp et al. |
| 5,037,172 | A | 8/1991 | Hekman et al. |
| 6,006,834 | A | 12/1999 | Skinner |
| 6,223,746 | B1 | 5/2001 | Skinner et al. |
| 6,355,928 | B1 | 3/2002 | Skinner et al. |
| 6,401,529 | B1 | 6/2002 | Robison et al. |
| 6,522,797 | B1 | 2/2003 | Siems et al. |
| 6,591,025 | B1 | 7/2003 | Siems et al. |

(Continued)

FOREIGN PATENT DOCUMENTS

WO   WO2014/062298   4/2014

OTHER PUBLICATIONS

Ramo, Simon et al., "Fields and Waves in Communication Electronics", 3rd Edition, John Wiley and Sons, New York, 1991, pp. 23-58 and 342-366, (1965), 36 pgs.

(Continued)

*Primary Examiner* — Brian Zimmerman
*Assistant Examiner* — Thomas McCormack
(74) *Attorney, Agent, or Firm* — Krueger Iselin LLP; Benjamin Fite

(57) ABSTRACT

A disclosed system for downhole time domain reflectometry (TDR) includes a surface electro-optical interface, a downhole electro-optical interface, a fiber-optic cable that couples the surface electro-optical interface and the downhole electro-optical interface, and an electrical transmission line that extends from the downhole electro-optical interface into a wellbore environment to enable TDR operations. A described method for downhole TDR includes transmitting an optical signal to a downhole environment, converting the optical signal to an electrical signal in the downhole environment, reflecting the electrical signal using an electrical transmission line in the downhole environment, analyzing data corresponding to the reflected electrical signal, and displaying a result of the analysis.

22 Claims, 5 Drawing Sheets

(56) References Cited

U.S. PATENT DOCUMENTS

| | | | |
|---|---|---|---|
| 6,731,389 B2 | 5/2004 | Luscombe et al. | |
| 6,747,743 B2 | 6/2004 | LeBlanc | |
| 6,847,034 B2 | 1/2005 | Shah et al. | |
| 6,874,361 B1 | 4/2005 | Meltz et al. | |
| 6,978,832 B2 | 12/2005 | Gardner et al. | |
| 7,072,588 B2 | 7/2006 | Skinner | |
| 7,228,900 B2 | 6/2007 | Schultz et al. | |
| 7,458,273 B2 | 12/2008 | Skinner et al. | |
| 7,490,664 B2 | 2/2009 | Skinner et al. | |
| 7,511,823 B2 | 3/2009 | Schultz et al. | |
| 7,938,175 B2 | 5/2011 | Skinner et al. | |
| 8,090,227 B2 | 1/2012 | Skinner et al. | |
| 8,278,923 B2 | 10/2012 | Samson et al. | |
| 2003/0127232 A1* | 7/2003 | Bussear et al. | 166/373 |
| 2004/0113104 A1 | 6/2004 | Maida | |
| 2004/0141420 A1 | 7/2004 | Hardage et al. | |
| 2005/0263281 A1* | 12/2005 | Lovell et al. | 166/255.1 |
| 2005/0274513 A1* | 12/2005 | Schultz et al. | 166/254.2 |
| 2006/0102343 A1* | 5/2006 | Skinner et al. | 166/250.1 |
| 2006/0132792 A1 | 6/2006 | Schultz et al. | |
| 2006/0289724 A1 | 12/2006 | Skinner et al. | |
| 2009/0133871 A1 | 5/2009 | Skinner et al. | |
| 2009/0166042 A1 | 7/2009 | Skinner et al. | |
| 2009/0271115 A1 | 10/2009 | Davis et al. | |
| 2009/0310642 A1 | 12/2009 | Skinner | |
| 2011/0140907 A1 | 6/2011 | Louden | |
| 2011/0163891 A1* | 7/2011 | Wilson | H04B 10/2504 340/854.9 |
| 2011/0308788 A1 | 12/2011 | Ravi et al. | |
| 2012/0014211 A1 | 1/2012 | Maida et al. | |
| 2012/0118578 A1 | 5/2012 | Skinner et al. | |
| 2012/0147381 A1 | 6/2012 | LeBlanc et al. | |
| 2012/0150451 A1 | 6/2012 | Skinner et al. | |
| 2012/0176250 A1* | 7/2012 | Duncan et al. | 340/853.2 |
| 2012/0179378 A1 | 7/2012 | Duncan et al. | |
| 2012/0257475 A1 | 10/2012 | Luscombe et al. | |
| 2013/0048277 A1* | 2/2013 | Parsche et al. | 166/272.1 |
| 2014/0111348 A1 | 4/2014 | Skinner et al. | |

OTHER PUBLICATIONS

"PCT Int'l Preliminary Report on Patentability" dated Dec. 30, 2014, Appl No. PCT/US2013/056752, "Downhole Time Domain Reflectometry with Optical Components" filed Aug. 27, 2013, 21 pgs.

Skinner, Neal G. et al., "PCT Int'l Search Report & Written Opinion" dated Aug. 13, 2014, "Downhole Time Domain Reflectometry with Optical Components", Appl No. PCT/US2013/056752 filed Aug. 27, 2013, 11 pgs.

"PCT Written Opinion", dated Jun. 1, 2015, Appl No. 13759389.3, "Downhole Time Domain Reflectometry with Optical Components," filed Aug. 27, 2013, 6 pgs.

* cited by examiner

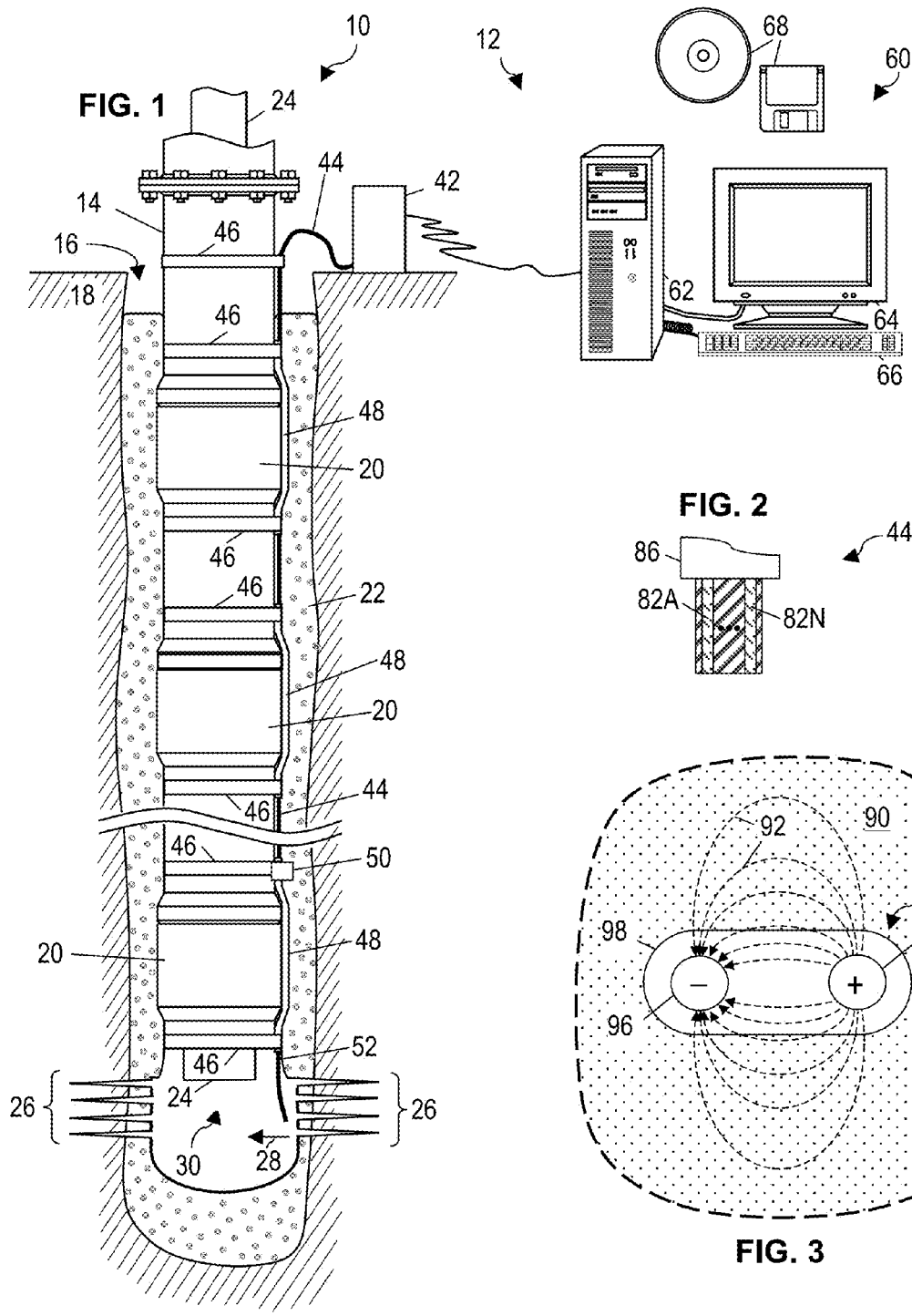

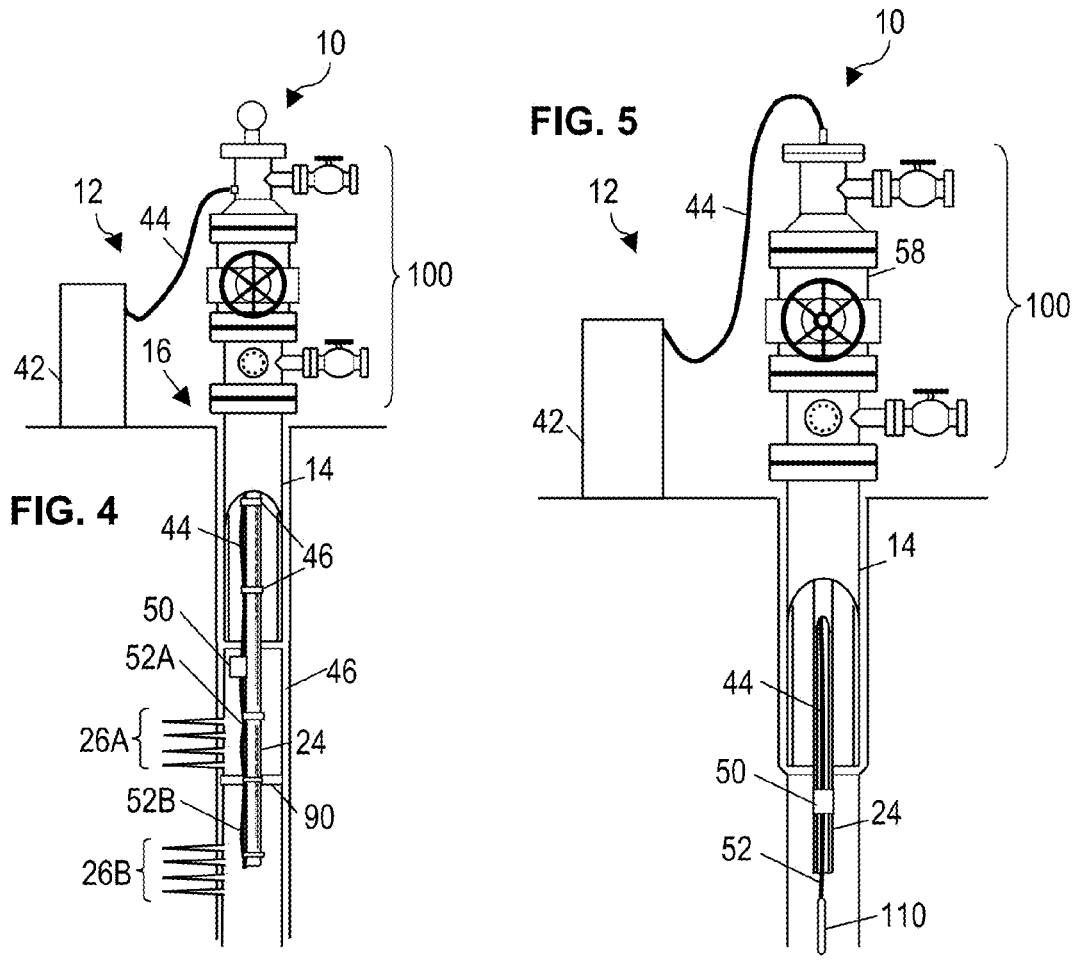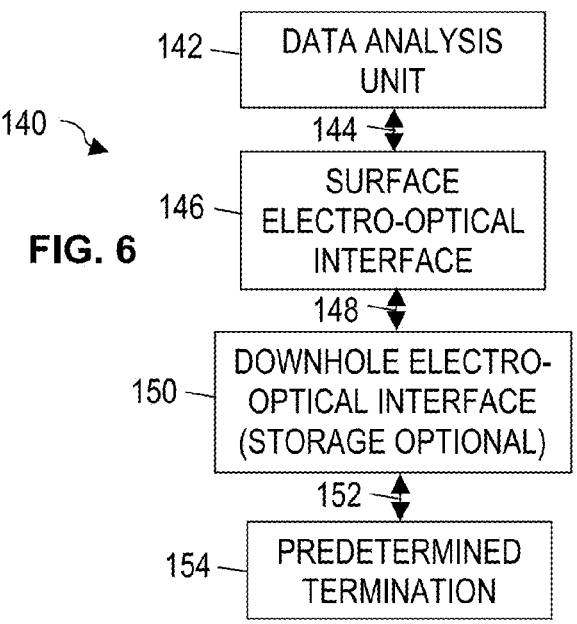

DOWNHOLE TIME DOMAIN REFLECTOMETRY WITH OPTICAL COMPONENTS

BACKGROUND

After a wellbore has been drilled, the wellbore typically is cased by inserting lengths of steel pipe ("casing sections") connected end-to-end into the wellbore. Threaded exterior rings called couplings or collars are typically used to connect adjacent ends of the casing sections at casing joints. The result is a "casing string" including casing sections and connecting collars that extends from the surface to a bottom of the wellbore. The casing string is then cemented in place to complete the casing operation. After a wellbore is cased, the casing is often perforated to provide access to one or more desired formations, e.g., to enable fluid from the formation(s) to enter the wellbore.

Hydraulic fracturing is an operating technique where a fracturing fluid, typically water with selected additives, is pumped into a completed well under high pressure. The high pressure fracturing fluid causes fractures to form and propagate within the surrounding geological formation, making it easier for formation fluids to reach the wellbore. During a fracturing treatment, sand or other high compression strength proppant is pumped into the fractured formation to keep the fractures open and provide a high permeability path for fluids to flow from the formation to the wellbore after releasing the treatment pressure. After fracturing is complete, the pressure is reduced, allowing most of the fracturing fluid to flow back into the well and to the surface. Some residual amount of the fracturing fluid may be expected to remain in the surrounding formation and perhaps flow back to the well over time as other fluids are produced from the formation.

During normal operations, the well produces a combination of fluids, typically including a desired hydrocarbon fluid (e.g., oil or gas) and water (i.e., "produced water"). The produced water can originate from multiple sources such as connate water from different formation layers, fracturing fluid, water injected from a remote well and/or steam injected from a remote well. These latter examples are typical of a steam or water flooding operation designed to force hydrocarbons to flow to the producing well.

With greater understanding of the downhole environment, operators are able to improve production of hydrocarbons. As an example, operators may increase the production of hydrocarbons by shutting off or deterring production from water zones. Alternatively, operators may decrease unwanted gas production by shutting off or deterring production from gas zones. There exists a need for improved systems or methods for analysis of downhole environments before or during production.

BRIEF DESCRIPTION OF THE DRAWINGS

Accordingly, there are disclosed herein downhole time domain reflectometry (TDR) techniques with optical components. In the drawings:

FIG. 1 is a side elevation view of an illustrative downhole TDR system in a production well;

FIG. 2 is a diagram of an illustrative fiber optic cable;

FIG. 3 is an illustration of a cross-sectional view of a transmission line in a downhole environment;

FIGS. 4 and 5 show alternative downhole TDR system embodiments;

FIG. 6 shows an illustrative block diagram of a downhole TDR system;

Figure 7A:
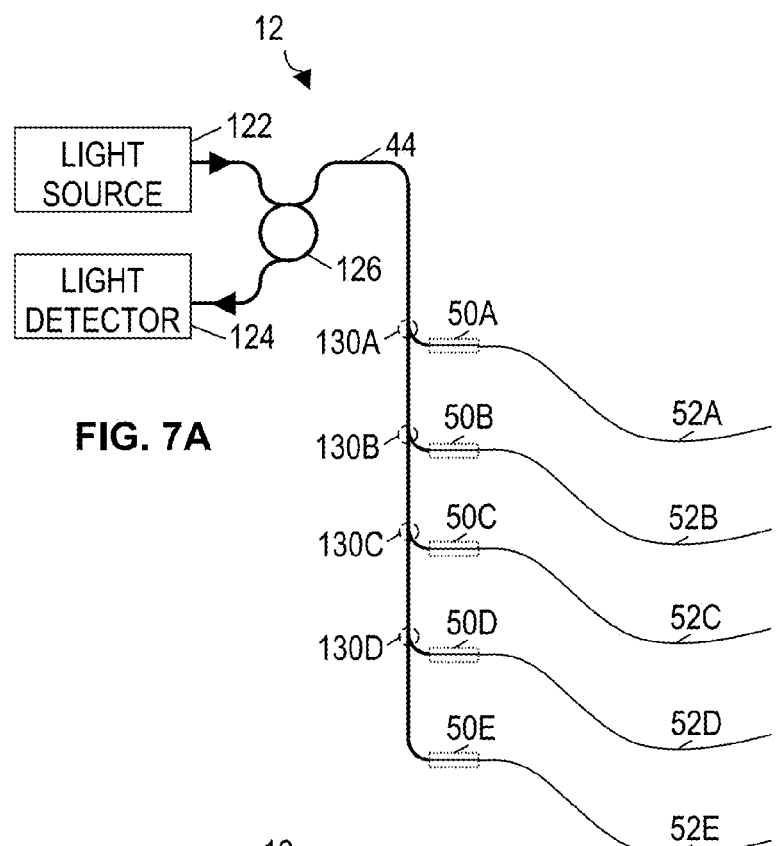
FIGS. 7A and 7B show distributed downhole TDR techniques.

It should be understood, however, that the specific embodiments given in the drawings and detailed description thereof do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Time domain reflectometry (TDR) involves feeding an impulse of energy into a system under test (e.g., a downhole environment) and observing the reflected energy at the point of insertion. When the fast-rise input pulse meets with a discontinuity or other electromagnetic mismatch, the resultant reflections appearing at the feed point are compared in phase and amplitude with the original pulse. By analyzing the magnitude, deviation and shape of the reflected signal, the nature of the electromagnetic variation in the system under test can be determined. Additionally, since distance is related to time and the amplitude of the reflected signal is directly related to impedance, the analysis yields the distance to the electromagnetic variation as well as the nature of the variation.

More specifically, electromagnetic waves traveling through a transmission line are reflected at locations where changes in an electromagnetic characteristic, such as impedance, exist. By way of example, transmission line lengths $X_1$, $X_2$ and $X_3$ are characterized by impedances $Z_1$, $Z_2$ and $Z_3$, respectively. In operation, any electromagnetic wave moving from the length of line $X_1$ to the length of line $X_2$ will be reflected at the interface of $X_1$ and $X_2$. The reflection coefficient, $\rho$, of this reflection can be expressed as follows: $\rho=(Z_2-Z_1)/(Z_2+Z_1)$. The transmission coefficient, $\tau$, for a wave traveling from section $X_1$ to section $X_2$ is provided by the following equation: $\tau=2Z_2/(Z_2+Z_1)$. In general, characteristic transmission line impedances Z1 and Z2 are complex valued quantities. For this reason, the reflection and transmission coefficients, r and t also may be complex values. If the incident wave has an amplitude, $A_i$, the reflected and transmitted waves have the following amplitudes: $A_\rho=|\rho|A_i$ and $A_\tau=|\tau|A_i$, where |•| denotes magnitude or absolute value and where $A_\rho$ and $A_\tau$ are the amplitudes of the reflected and transmitted waves, respectively. Those skilled in the art will appreciate that similar equations may be derived for the interface of $X_2$ and $X_3$. Further, it will be understood that the impedances $Z_1$, $Z_2$ and $Z_3$ change in response to the varying composition and, in particular, oil, water, gas, and sand compositions, surrounding the transmission line within lengths $X_1$, $X_2$ and $X_3$.

In addition to the amplitudes of the reflected and transmitted waves, the propagation velocity of the electromagnetic wave that travels through the downhole medium as it propagates through a transmission line is of interest in time domain reflectometry. For example, a transmission line will contact physical discontinuities at the interface of $X_1$ and $X_2$ as well as at the interface of $X_2$ and $X_3$, such that the physical discontinuities are separated by a distance $X_2$. The time that a reflection from the discontinuity at interface $X_1$-$X_2$ arrives at the time domain reflectometer may be designated $T_1$ and the time that the reflection from the discontinuity at interface $X_2$-$X_3$ arrives at the time domain reflectometer may be designated $T_2$, such that the propagation velocity, V, may be expressed as: $V=2X_2/(T_2-T_1)$. The impedance, Z of the transmission line and the velocity of a pulse propagating through the transmission line depends in part on the dielectric constant of the material surrounding the line. The apparent dielectric constant of the downhole medium is related to the amount of oil, water, sand, gas, gravel and proppants, for example, present in the downhole medium. In one implementation, all analysis system based upon empirical data may be utilized to determine the constituent materials of a downhole medium corresponding to a measured apparent dielectric constant.

These equations or similar equations are utilized to determined the downhole conditions when the transmission signal is generated at a time domain reflectometer and propagated through a transmission lines associated with a tubular that is positioned in the downhole medium. Transmission lines may be utilized independently in different configurations to propagate the signal.

In the TDR implementations mentioned herein, the transmission signal is reflected in response to the electromagnetic profile of the downhole medium and, in particular, in response to an impedance change in the downhole medium caused by a change in the electromagnetic profile of the constituents of the downhole medium. The reflected signals are received at the time domain reflectometer and analyzed using the equations discussed hereinabove to determine the downhole conditions. Disclosed herein is a downhole TDR system with optical components.

Turning now to the figures, FIG. 1 shows a production well 10 equipped with an illustrative downhole time domain reflectometry (TDR) system 12. The well 10 shown in FIG. 1 has been constructed and completed in a typical manner, and it includes a casing string 14 positioned in a borehole 16 that has been formed in the earth 18 by a drill bit. The casing string 14 includes multiple tubular casing sections (usually about 30 foot long) connected end-to-end by couplings. One such coupling is shown in FIG. 1 and labeled '20.' Within the well 10, cement 22 has been injected between an outer surface of the casing string 14 and an inner surface of the borehole 16 and allowed to set. A production tubing string 24 has been positioned in an inner bore of the casing string 14.

The well 10 is adapted to guide a desired fluid (e.g., oil or gas) from the bottom of the borehole 16 to the surface of the earth 18. Perforations 26 have been formed near the bottom of the borehole 16 and through cement 22 and casing 14 to facilitate the flow of a fluid 28 from a surrounding formation (i.e., a "formation fluid") into the borehole and thence to the surface via an opening 30 at the bottom of the production tubing string 24. Though only one perforated zone is shown, many production wells may have multiple such zones, e.g., to produce fluids from different formations. Each such formation may produce oil, gas, water, or combinations thereof at different times.

As an example, the fluid 28 produced by the well may include oil or gas along with water (i.e., "produced water") originating from one or more sources. For example, the water in the produced fluid 28 may be a mixture of water from the surrounding formation (i.e., "formation water" such as connate water) and fracturing fluid previously pumped into the surrounding formation under high pressure via the production tubing string 24. Alternately, or in addition, the produced water may include water from other formations, or injected water from injection wells (e.g., flood fluid from a remote well). It is noted that the configuration of well 10 in FIG. 1 is illustrative and not limiting on the scope of the disclosure.

As described in more detail below, the downhole TDR system 12 is adapted to detect a characteristic impedance of the fluid 28 at the bottom of the borehole 16. The characteristic impedance is determined, for example, by application of downhole TDR operations in a region of interest (e.g., at the bottom of the borehole 16 or other downhole areas) and subsequent analysis. Rather than extend a transmission line directly from the surface to a downhole region of interest, the disclosed downhole TDR system 12 employs a surface electro-optical interface 42 coupled to a downhole electro-optical interface 50 by a fiber-optic cable 44.

In the embodiment of FIG. 1, the fiber-optic cable 44 extends along an outer surface of the casing string 14 and is held against the outer surface of the casing string 14 at spaced apart locations by multiple bands 46 that extend around the casing string 14. A protective shield may be installed over the fiber-optic cable 44 at each of the couplings of the casing string 14 to prevent the cable from being pinched or sheared by the coupling's contact with the borehole wall. The protective shield may consist of a metallic tube, similar to a downhole hydraulic control line to isolate the fiber(s) from potentially deleterious wellbore fluids and wellbore pressure. In FIG. 1, a protective shield 48 is installed over the fiber optic cable 44 at each coupling 20 of the casing string 14 and is held in place by two of the bands 46 installed on either side of each coupling 20.

In at least some embodiments, the fiber-optic cable 44 terminates at the surface electro-optical interface 42 with an optical port adapted for coupling the fiber-optic cable 44 to a light source (e.g., a pulsed laser) and a photodetector. The light source transmits light along the fiber-optic cable 44 to the downhole electro-optical interface 50, which employs an optical port adapted to convert light signals to electrical signals and vice versa. The electrical signals are carried along downhole transmission line 52 to enable TDR operations. The downhole electro-optical interface 50 returns light along the fiber-optic cable 44 to the surface electro-optical interface 42 where the optical port communicates it to a photodetector. The photodetector responsively produces an electrical output signal indicative of reflections in the downhole environment. The optical port of the surface electro-optical interface 42 may be configured to communicate down-going light signals along one or more optical fibers that are different from the optical fibers carrying returning (up-going) light signals, or may be configured to use the same optical fibers for communicating both light signals. Similarly, the optical port of the downhole electro-optical interface 50 may be configured to communicate up-going light signals along one or more optical fibers that are different from the optical fibers carrying down-going light signals, or may be configured to use the same optical fibers for communicating both light signals.

As an example operation, electrical control signals are converted to optical signals by the surface electro-optical interface 42, and are carried by the fiber-optic cable 44 to the downhole electro-optical interface 50. The downhole electro-optical interface 50 converts the optical signals to corresponding electrical signals, which are carried by a transmission line 52 in the downhole region of interest. As explained further below, reflections of the electrical signals carried by the transmission line 52 may be generated due to variations in the characteristic impedance of oil, gas, or water in the region of interest. Further, the transmission line 52 may be arranged as an open-circuit or a closed circuit to facilitate conversion of reflections to optical signals by the downhole electro-optical interface 50. The purpose of the open or closed circuit end of the transmission line is to help identify the physical end of the transmission line. The optical signals corresponding to reflected electrical signals in the region of interest are then transmitted from the downhole electro-optical interface 50 to the surface electro-optical interface 42 via the fiber-optic cable 44. The surface electro-optical interface 42 converts the received optical signals to corresponding electrical signals for filtering, storage, and analysis.

As an example, storage and analysis of reflected signals captured by the downhole TDR system 12 may be performed by a computer 60 coupled to the surface electro-optical interface 42. The computer 60 also may provide one or more control signals (automatically or by user request) to initiate downhole TDR operations. The computer 60 also may perform filtering operations to remove interfering frequencies from captured data. Additionally or alternatively, the surface electro-optical interface 42 may perform filtering operations. The illustrated computer 60 includes a chassis 62, an output device 64 (e.g., a monitor as shown in FIG. 1, or a printer), an input device 66 (e.g., a keyboard), and information storage media 68 (e.g., magnetic or optical data storage disks). However, the computer may be implemented in different forms including, e.g., an embedded computer permanently installed as part of the surface electro-optical interface 42, a portable computer that is plugged into the surface electro-optical interface 42 as desired to collect data, a remote desktop computer coupled to the surface electro-optical interface 42 via a wireless link and/or a wired computer network, a mobile phone/PDA, or indeed any electronic device having a programmable processor and an interface for I/O.

In some embodiments, the information storage media 68 stores a software program for execution by computer 60. The instructions of the software program may cause the computer 60 to collect information from downhole TDR operations. The instructions of the software program may further cause the computer 60 to determine characteristic impedance variations from the collected information and to identify one or more oil zones, gas zones, or water zones. Further, the instructions of the software program may further cause the computer 60 to identify oil-gas boundaries, oil-water boundaries, or gas-water boundaries based on the collected information. As an example, the time required for a pulse to travel from the downhole electro-optical interface 50 to the end of the transmission line 52 and back to the downhole electro-optical interface 50 may be used to estimate the average propagation velocity of the transmission line 52. Since the dielectric constants or relative permittivity's of oil, gas, water, or other fluids in a wellbore are different, the line impedance and the velocity of the propagating pulse will change with changing materials around the transmission line 52. More specifically, the propagation velocity can be measured as 2L/t, where L=length of the transmission line, and t=the time required for a pulse to travel to the distal end of the transmission line and back.

Further, if a first portion of the transmission line 52 is surrounded by one material and a second portion of the transmission line is surrounded by another material, a first portion will have one characteristic impedance while the second portion will have another characteristic impedance. In other words, the line impedance $Z_0$ changes in response to the material surrounding the line due to electric fields extending outside of the transmission line during operation. The result will be a reflection at the interface between the two impedances of $(Z_2-Z_1)/(Z_2+Z_1)$ times the amplitude of the initial phase. With proper analysis of timing and magnitude of reflections along the transmission line 52, a determination of which portions of the transmission line 52 are surrounded by oil, gas, or water is possible.

Without limitation to other examples, FIG. 2 illustrates the fiber-optic cable 44 in accordance with an embodiment. As shown, the fiber-optic cable 44 comprises an outer sheath 86 for insulation and/or protection. Within the outer sheath 86, a plurality of optical fibers 82A-82N extend along the length of the fiber-optic cable 44. The number of optical fibers 82A-82N may vary depending on the number of downhole electro-optical interfaces and/or other criteria. With a plurality of optical fibers, different fibers may be used for downward transmissions and upward transmissions. Further, different fibers may facilitate TDR operations in different areas of a downhole environment. In such case, a plurality of downhole electro-optical interfaces 50 and transmission lines 52 may also be used to facilitate TDR operations in different areas of a downhole environment. Further, some fibers may be used for other downhole sensing applications, not related to TDR measurements such as pressure, temperature, acoustics, seismic, electromagnetic fields, flow, distributed temperature, distributed pressure, or distributed acoustics.

FIG. 3 illustrates a cross-sectional view 88 of transmission line 52 in a downhole environment 90 in accordance with an embodiment. In the cross-sectional view 88, transmission line 52 comprises parallel conductors 94 and 96 within an insulative/protective layer 98. Without limitation, the insulative/protective layer 98 and the conductors 94 and 96 may be in relatively flat arrangement (e.g., a twinaxial cable arrangement). During TDR operations, the conductors 94 and 96 are at different voltage potentials. More specifically, conductor 94 is shown to be at a higher voltage that conductor 96. Accordingly, an electric field 92 is formed between conductors 94 and 96. To enable effective TDR operations, the transmission line 52 and its conductors 94 and 96 are arranged such that electromagnetic fields 92 during TDR operations extend into the downhole environment 90. With such an arrangement, the characteristic impedance of the downhole environment 90 affects the speed and magnitude of signal propagation along the transmission line 52.

In some embodiments, the transmission line 52 may comprise additional parallel conductors (e.g., three or more). The number of conductors employed for each transmission line may be determined, for example, based on predetermined wellbore depth information, predetermined power criteria, or predetermined signal-to-noise ratio (SNR) criteria.

FIG. 4 shows an alternative embodiment of a downhole TDR system 12 where the fiber-optic cable 44 and the downhole electro-optical interface 50 are strapped to the outside of the production tubing 24 rather than the outside of casing 14. Two perforations 26A and 26B have been created in the borehole 16 to facilitate the obtaining of formation fluids from two different zones. Formation fluid from a first of the two zones enters the casing string 14 via the perforation 26A, and formation fluid from the other zone enters the production tubing string 24 via the perforation 26B. A packer 90 seals an annulus around the production tubing string 24 to define the two different zones. Without limitation, a single downhole electro-optical interface 50 is employed in FIG. 4. In operation, transmission line portion 52A is used to conduct TDR operations in the first zone and transmission line portion 52B is used to conduct TDR operations in the second zone. The transmission line portions 52A and 52B may correspond to separate transmission lines or a single transmission line that extends into both zones. In either case, formation fluid in both zones can be analyzed based on one or more TDR operations.

In the embodiment of FIG. 4, the downhole electro-optical interface 50 couples to the surface electro-optical interface 42 via the fiber-optic cable 44 as before. For example, the fiber-optic cable 44 may exit through an appropriate port in a "Christmas tree" 100, i.e., an assembly of valves, spools, and fittings connected to a top of a well to direct and control a flow of fluids to and from the well. The fiber-optic cable 44 extends along the outer surface of the production tubing string 24, and is held against the outer surface of the of the production tubing string 24 at spaced apart locations by multiple bands 46 that extend around the production tubing string 24. In other embodiments, multiple downhole electro-optical interfaces 50 may be coupled to one or more surface electro-optical interfaces 42 via different fiber optic cables extending along the outer surface of the production tubing string 24.

FIG. 5 shows another alternative embodiment of downhole TDR system 12 having the fiber-optic cable 44 and the downhole electro-optical interface 50 suspended inside production tubing 24. A weight 110 or other conveyance mechanism is employed to deploy and possibly anchor the fiber-optic cable 44 within the production tubing 24 to minimize risks of tangling and movement of the cable from its desired location. The downhole electro-optical interface 50 may be positioned at or near the bottom of the well near weight 110. The fiber-optic cable 44 exits the well via an appropriate port in Christmas tree 100 and attaches to the surface electro-optical interface 42.

Other alternative embodiments employ composite tubing with one or more optical fibers embedded in the wall of the tubing. The composite tubing can be employed as the casing and/or the production string. In either case, a coupling or terminator can be provided at the end of the composite tubing to couple a downhole electro-optical interface 50 to the embedded optical fiber. Alternatively, a cable could be arranged inside or outside of normal, metallic coiled tubing. Further, a cable containing a downhole electro-optical interface and a weighted section of transmission line may be run on the end of standard electric cable.

The well 10 illustrated in FIGS. 1, 4, and 5 offers two potential flow paths for fluid to move between the surface and the bottom of the well. The first, and most commonly employed, is the interior of the production tubing. The second is the annular space between the production tubing and the casing. Usually the outermost annular space (outside the casing) is sealed by cement for a variety of reasons typically including the prevention of any fluid flow in this space. Usually, the point at which it is most desirable to perform downhole TDR operations will be the point at which produced fluid enters the borehole, i.e., the completion zone, or points of potential constriction, e.g., where the fluid enters the flow path and any branches, chokes, or valves along the flow path. In some cases, one downhole electro-optical interface 50 and transmission line 52 will be sufficient, and it can be located at the end of the fiber-optic cable 44 in one of the deployments described previously.

However, other well configurations are known that have a substantial number of flow paths, particularly wells designed to produce from multiple completion zones. It may be desirable to provide multiple downhole electro-optical interfaces 50 and transmission lines 52 so as to be able to individually monitor each fluid flow. Moreover, it may be desirable to provide multiple downhole electro-optical interfaces 50 and transmission lines 52 along a given fluid flow path. While it is possible to perform downhole TDR operations by providing a separate fiber optic cable for each downhole electro-optical interface 50, it will be in many cases more efficient to utilize a single fiber-optic cable for multiple downhole electro-optical interfaces 50.

FIG. 6 shows an illustrative block diagram of a downhole TDR system 140. Without limitation to other embodiments, the downhole TDR system 140 shows components described for downhole TDR systems 12 of FIGS. 1, 4, and 5. As shown, the downhole TDR system 140 comprises a data analysis unit 142 coupled to a surface electro-optical interface 146 via a communication line 144. The communication line 144 may transmit TDR control signals or TDR result signals between the data analysis unit 142 and the surface electro-optical interface 146. Meanwhile, the surface electro-optical interface 146 couples to a downhole electro-optical interface 150 via a fiber-optic cable 148 as described herein. As an option, the downhole electro-optical interface 150 may include storage to facilitate TDR operations. The storage may enable a build-up of charge or may enable TDR instructions or data to be stored downhole. A transmission line 152 with an predetermined termination 154 (e.g., open-circuit, closed-circuit, or matched impedance termination) extends from the downhole electro-optical interface 150 to support TDR operations. In different embodiments, the number of data analysis units 142, communication lines 144, surface electro-optical interfaces 146, fiber-optic cables 148, downhole electro-optical interfaces, and transmission lines 152 may vary. Further, the number of conductors in different transmission lines may vary. Further, transmission lines 152 in a winding arrangement may be employed to increase monitoring sensitivity in a particular downhole region or tool portion.

In some embodiments, components of the downhole TDR system 140 may be integrated with a sand control screen. In particular, one or more transmission line 152 may extend along or wrap around a sand control screen to monitor conditions around the sand control screen. To support such monitoring, one or more downhole electro-optical interfaces 150 may be positioned at or near the sand control screen being monitored. For example, transmission lines 152 may extend from nearby downhole electro-optical interfaces 150, and may extend along and/or wrap around a sand control screen to support monitoring operations. Without limitation to other embodiments, the downhole TDR system 140 disclosed herein may employ arrangements of transmission lines and sand control screens such as the arrangements described in U.S. Pat. No. 7,228,900, entitled "System and Method for Determining Downhole Conditions", which is hereby incorporated herein by reference in its entirety.

Figure 7B:
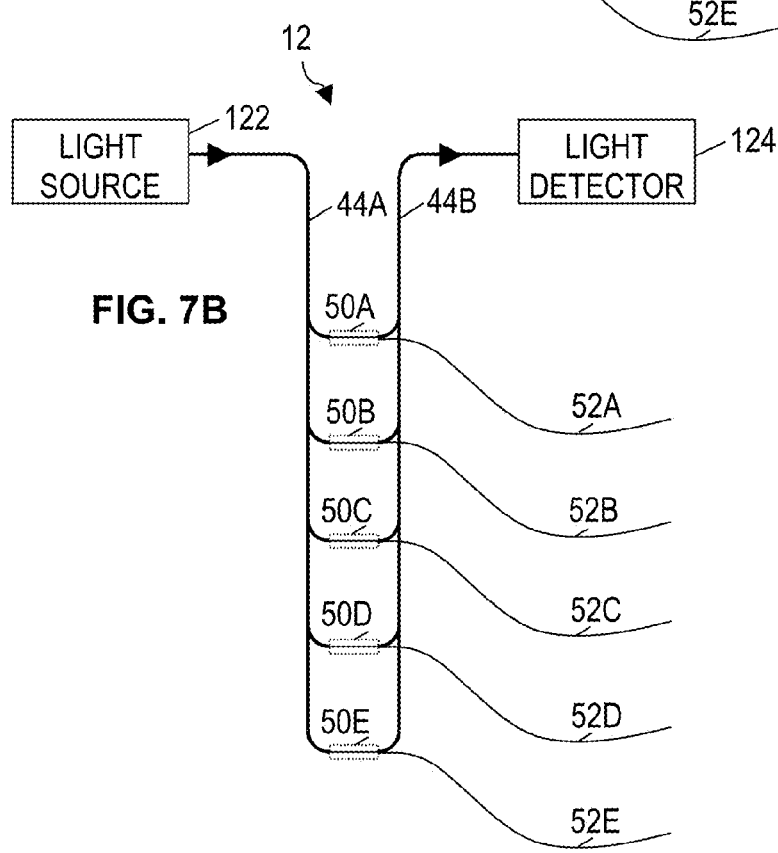

FIGS. 7A and 7B show illustrative distributed downhole TDR techniques. In FIGS. 7A and 7B multiple spaced-apart downhole electro-optical interfaces 50A-50E are employed for different variations of a downhole TDR system 12. Although not required, each of the downhole electro-optical interfaces 50A-50E may correspond to different downhole zones and are associated with at least one transmission line 52A-52E. The transmission line(s) associated with each downhole electro-optical interfaces 50A-50E is in contact with the fluids in the corresponding zones such that TDR operations can be used to ascertain characteristic impedance variations in the zones as described herein.

In the embodiment of FIG. 7A, a light source 122 and a light detector 124 are coupled to the fiber-optic cable 44 via an optical circulator or coupler 126. The light source 122 (e.g., a pulsed laser) and the light detector 124 (e.g., a photodiode) may be part of a surface electro-optical interface as described herein. Optical splitters 130A-130D couple the fiber-optic cable 44 to the downhole electro-optical interfaces 50A-50D, and a last downhole electro-optical interface 50E may be coupled to the terminal end of the fiber-optic cable 44. The optical circulator or coupler 126 routes pulses of light from light source 122 to the optical fiber in fiber-optic cable 44. Each pulse of light propagates along the optical fiber to the series of optical splitters 130A-130D. Each splitter directs a portion of the light to the corresponding downhole electro-optical interface and passes the remainder of the light along the cable 44. Each of the downhole electro-optical interfaces 50A-50E is adapted to convert light signals to electrical signals for TDR operations and to convert reflected electrical signals to corresponding light signals. The optical splitters 130A-130D recombine the resulting light signals into a single beam propagating upward along the fiber-optic cable 44. Due to the travel-time differences, the light propagating upward now consists of a series of pulses, the first pulse corresponding to the first downhole electro-optical interfaces 50A, the second pulse corresponding to the second downhole electro-optical interfaces 50B, etc. The optical circulator 126 directs these pulses to the light detector 124 which conveys downhole TDR measurements to a data analysis unit as described herein.

Where the fiber-optic cable 44 includes multiple optical fibers or multi-stranded optical fibers, the downhole electro-optical interfaces 50A-50E can be directly coupled to different ones of the optical fibers or strands. The optical splitters would not be needed in this variation. The light detector 124 can be coupled to measure the total light returned along the multiple fibers or strands, as the travel time difference to the various sensors will convert the transmitted light pulse into a series of reflected light pulses, with each pulse representing a corresponding TDR measurement.

In some embodiments, wavelength division multiplexing (WDM) may be employed with a downhole TDR system. In WDM, the couplers or splitters are wavelength dependent and only a narrow range of wavelengths passes from the main fiber to the one connected with the WDM coupler. In order to make a reading from a particular TDR line, a laser with proper wavelength may be fired into the line. Optical energy only enters the TDR system whose WDM coupler passes that particular wavelength.

The embodiment shown in FIG. 7B is similar to the embodiment of FIG. 7A. Rather than using a single optical fiber for both downward-going and upward-going light, however, the embodiment of FIG. 7B separates the downward-going light path 44A from the upward-going light path 44B. Though both paths may be contained in a single fiber optic cable, the two light paths are carried on separate fibers. Light pulses from light source 122 travel downward on path 44A, are distributed to the downhole electro-optical interfaces 50A-50E. Each of the downhole electro-optical interfaces 50A-50E is adapted to convert light signals to electrical signals for TDR operations and to convert reflected electrical signals to corresponding light signals on a separate return fiber as described herein. Travel time differences will produce a series of resulting light pulses at the light detector 124, each pulse corresponding to a different downhole electro-optical interface. Alternatively, or in addition, the downhole electro-optical interfaces 50A-50E may operate in different wavelength bands and the TDR measurements may be distinguished accordingly.

Figure 8A:
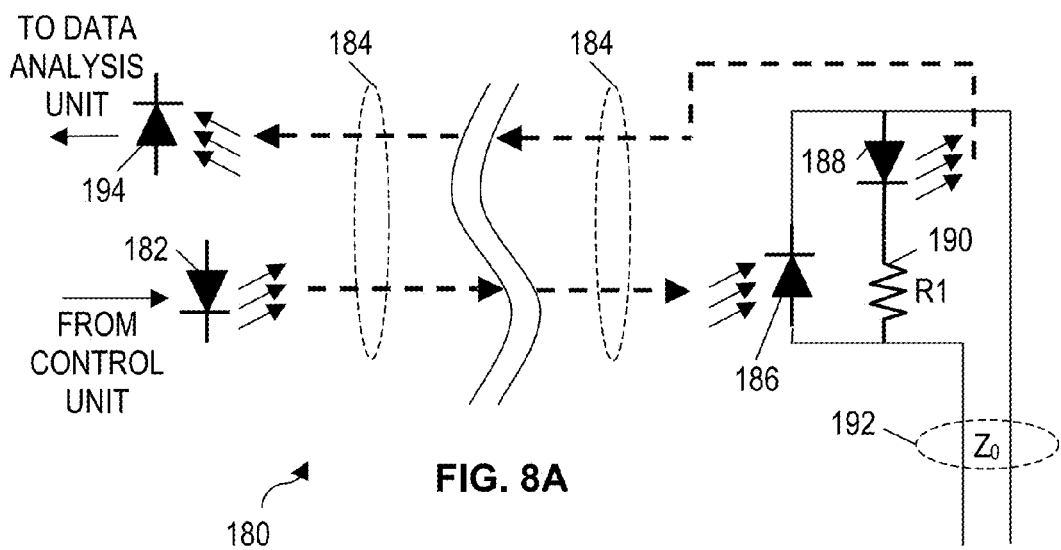
FIGS. 8A and 8B show electro-optical TDR circuits.

FIG. 8A shows an electro-optical TDR circuit 180 in accordance with an embodiment. As shown, the electro-optical TDR circuit 180 comprises a light source (e.g., a pulsed laser) 182 configured to receive an electrical control signal from a control unit. The light signal output from the light source 182 is carried by fiber-optic cable 184 to a downhole location, where photodiode 186 converts received light signals to corresponding electrical signals. The electrical signals output from photodiode 186 are carried by transmission line 192 in the downhole environment, the transmission line 192 having a characteristic impedance $Z_0$. With the transmission line 192 arranged as an open circuit, reflections along the transmission line 192 will forward-bias LED 188 resulting in light signals corresponding to the reflections. As shown, photodiode 186 and LED 188 are arranged in parallel. Further, a resistor (R1) 190 may be in series with LED 188. The fiber-optic cable 184 returns light signals from LED 188 to the surface, where a photodiode 194 converts any received light signals to electrical signals for storage and analysis by a data analysis unit.

In operation, the photodiode 186 of downhole TDR circuit 180 is configured to convert a TDR interrogation signal from an optical signal to an electrical signal in a downhole environment. The converted interrogation signal is provided to the transmission line 192, and the LED 188 receives interrogation response signals (reflections) from the transmission line 192. The LED 188 converts TDR interrogation response signals from an electrical signal to an optical signal in the downhole environment for transport to the surface via fiber-optic cable 184.

In some embodiments, the transmission line 192 comprises two parallel conductors in a twinaxial arrangement and with a predetermined termination (e.g., open-circuit, closed-circuit, or matched impedance circuit). If transmission line 192 has an open-circuit termination, the LED 188 may be arranged as shown of the downhole electro-optical interface is arranged as shown for electro-optical TDR circuit 180. If transmission line 192 has a closed-circuit termination, the LED 188 may be arranged in the opposite direction as that shown for electro-optical TDR circuit 180. The LED 188 may be arranged such that reflections from transmission line 192 may operate to forward-bias the LED 188. Alternatively, other control circuitry may forward-bias LED 188.

For the downhole TDR circuit 180, the light source 182 and the photodiode 194 may be part of a surface electro-optical interface as described herein. Further, the photodiode 186, the LED 188, and the resistor 190 may be part of a downhole electro-optical interface as described herein. In various downhole TDR circuit embodiments, additional optical components, such as optical fibers, optical circulators, and optical splitters may be employed. Further, downhole TDR circuits employ additional components corresponding to multiple downhole electro-optical interfaces. Further, each downhole electro-optical interface of a downhole TDR circuit may be associated with a transmission line with more than two parallel conductors, or may utilize a plurality of transmission lines as described herein. As an example, the quantity and length of the transmission line conductors may be predetermined based on a power criteria or signal-to-noise (SNR) criteria. Further, the position of the transmission line 192 may be selected to enable detection of characteristic impedance variations in a downhole environment that indicate the location of oil-gas boundaries, gas-water boundaries, or oil-water boundaries. Further, sand environment or sand boundaries may be detected.

Figure 8B:
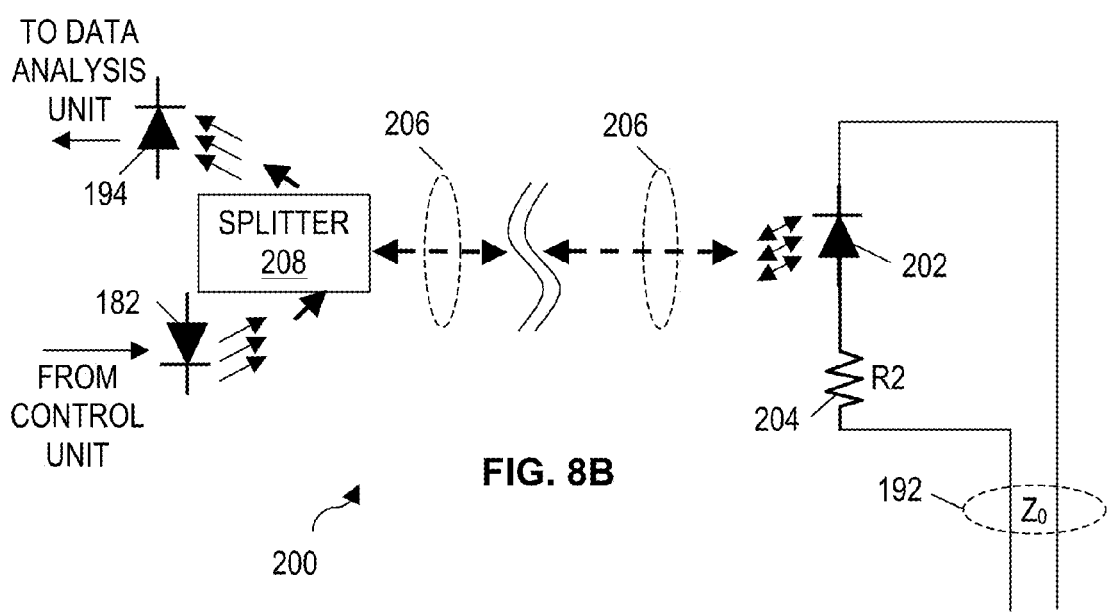

FIG. 8B shows another electro-optical TDR circuit 200 in accordance with an embodiment. Various components of the electro-optical TDR circuit 200 are the same as circuit 180 including light source 182, photodetector 194, and transmission line 192. In circuit 200, a bi-directional fiber arrangement 206 with one or more fibers may be employed to carry light signals from the surface to the downhole location and vice versa. The bi-directional fiber arrangement 206 may be coupled to a splitter 208 that receives signals from light source 182 and that forwards signals to photodetector 194. At the downhole location, component 202 may operate as a light source and as a light detector in communication with the transmission line 192 and with fiber arrangement 206. As shown, component 202 may be in series with a resistor (R2) 204. A surface electro-optical interface may likewise employ a component that operates as both a light source and a light detector.

Figure 9:
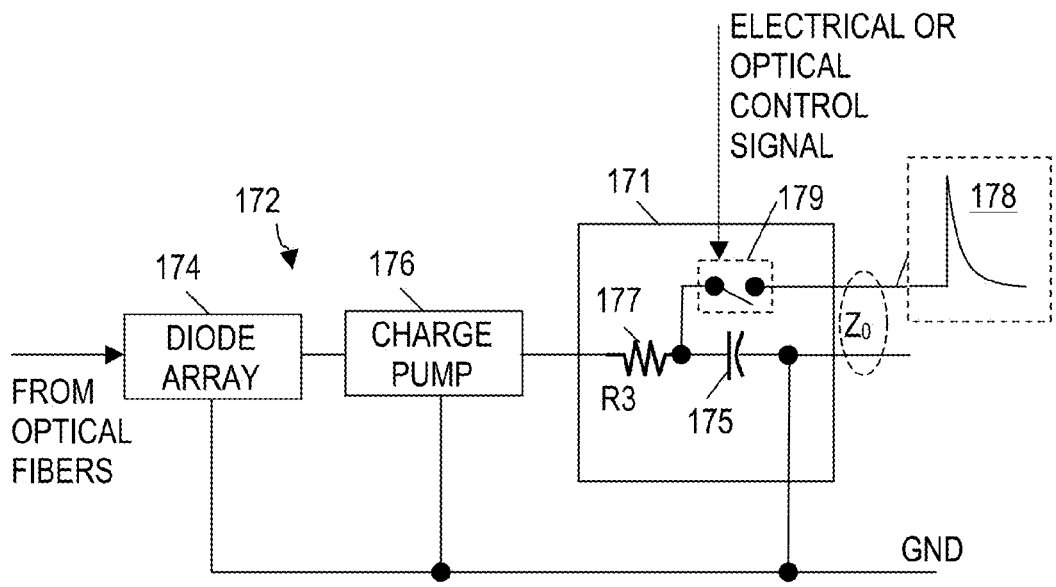
FIG. 9 shows an electro-optical interface circuit with storage and trigger components.

FIG. 9 shows an illustrative electro-optical interface circuit 172 with storage and trigger components. The electro-optical interface circuit 172 may be implemented with a downhole TDR system as described herein (e.g., as part of a downhole electro-optical interface). As shown, the electro-optical interface circuit 172 comprises a diode array 174 and a charge pump 176. The diode array 174 operates to convert optical signals to electrical signals that are forwarded to charge pump 176 and trigger 171 to enable energy accumulation. The trigger 171 enables a stored energy wave or pulse 178 to be released for TDR operations along a transmission line with impedance $Z_0$. In an embodiment, the trigger 171 includes a switch 179, a resistor (R3) 177, and a capacitor 175. The energy level of pulse 178 is based on the storage of energy accumulated over time by capacitor 175. The switch 179 is opened or closed based on an electrical control signal or optical control signal. As an example, the switch 179 may be opened or closed in response to the voltage across the capacitor 175 reaching a predetermined value or threshold, or by an external triggering circuit (not shown).

Figure 10:
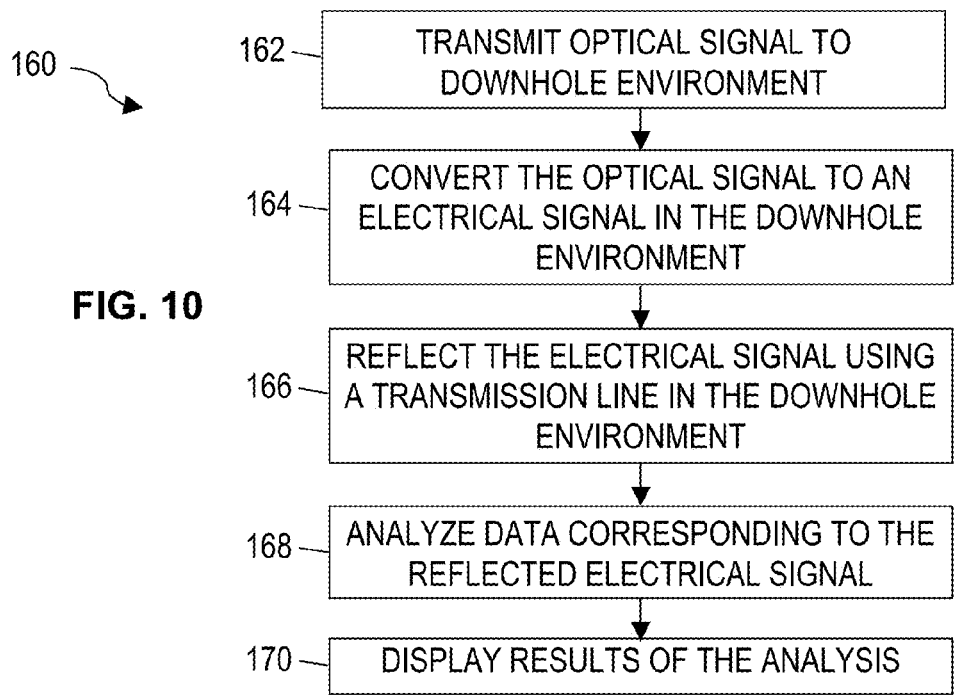
FIG. 10 is a flowchart of an illustrative method for downhole TDR.

FIG. 10 is a flowchart of a method 160 for downhole TDR. During a first block 162 of the method 160, an optical signal is transmitted to a downhole environment 162. The optical signal is converted into an electrical signal in the downhole environment at block 164. The electrical signal is reflected using a transmission line in the downhole environment at block 166. At block 168, data corresponding to the reflected electrical signal is analyzed. Results of the analysis are displayed at block 170.

In some embodiments, the method 160 may comprise additional or fewer steps. For example, the method 160 may additionally comprises identifying a water zone, a sand zone, a gas zone, or an oil zone based on the analyzed data. Further, the method 160 may comprise detecting a characteristic impedance variation in the downhole environment based on the reflected electrical signal, and correlating the detected characteristic impedance variation with an oil-gas boundary, a water-gas boundary, or a water-oil boundary. Sand boundaries also may be detected. Further, the method 160 may comprise generating a control signal and converting the control signal to the optical signal that is transmitted to the downhole environment. Further, the method 160 may comprise converting reflected electrical signals to corresponding optical signal in the downhole environment, transmitting the corresponding optical signals to a surface environment, and converting the corresponding optical signals to resulting electrical signals to enable subsequent TDR data analysis.

Numerous modifications, equivalents, and alternatives will become apparent to those skilled in the art once the above disclosure is fully appreciated. It is intended that the following claims be interpreted (where applicable) to embrace all such modifications, equivalents, and alternatives.

What is claimed is:

1. A downhole time domain reflectometry (TDR) system, the system comprising:
a surface electro-optical interface;
a downhole electro-optical interface;
a fiber-optic cable that is deployed in a borehole and that couples the surface electro-optical interface and the downhole electro-optical interface;
an electrical transmission line that extends from the downhole electro-optical interface into a region of interest with one or more formation fluids that contact the electrical transmission line; and
a data analysis unit coupled to the surface electro-optical interface, wherein the data analysis unit is configured to analyze TDR interrogation response signals to recover electromagnetic profile information regarding the one or more formation fluids, wherein the TDR interrogation response signals are obtained by using the downhole electro-optical interface to convert a TDR interrogation signal from an optical signal conveyed by the fiber-optic cable to an electrical signal conveyed by the electrical transmission line, and to convert a TDR interrogation response signal from a reflected electrical signal conveyed by the electrical transmission to a corresponding optical signal conveyed by the fiber-optic cable.

2. The downhole TDR system of claim 1, wherein the surface electro-optical interface comprises a light source, a light detector separate from the light source, and an optical amplifier.

3. The downhole TDR system of claim 1, wherein the surface electro-optical interface comprises a component that operates as a light source and as a light detector.

4. The downhole TDR system of claim 1, wherein the downhole electro-optical interface comprises a light detector and a light source separate from the light detector.

5. The downhole TDR system of claim 1, wherein the downhole electro-optical interface comprises a component that operates as a light source and as a light detector.

6. The downhole TDR system of claim 1, wherein the downhole electro-optical interface comprises an energy storage unit with a trigger to release accumulated energy.

7. The downhole TDR system of claim 6, wherein the trigger is activated based on at least one of an electrical control signal, an optical control signal, and a voltage across the energy storage unit reaching a predetermined threshold.

8. The downhole TDR system of claim 1, wherein the electrical transmission line comprises two parallel conductors in a twinaxial arrangement and with a predetermined termination.

9. The downhole TDR system of claim 8, wherein a light source of the downhole electro-optical interface is arranged for when the predetermined termination is an open-circuit.

10. The downhole TDR system of claim 8, wherein a light source of the downhole electro-optical interface is arranged for when the predetermined termination is a closed-circuit.

11. The downhole TDR system of claim 1, wherein the transmission line comprises a plurality of transmission lines to account for at least one of a predetermined wellbore depth, a predetermined power limitation, and a predetermined signal-to-noise ratio (SNR) limitation.

12. The downhole TDR system of claim 1, further comprising a plurality of downhole electro-optical interfaces assigned to different downhole zones, and an optical fiber arrangement to convey power to the plurality of downhole electro-optical interfaces.

13. The downhole TDR system of claim 12, wherein the optical fiber arrangement is configured to employ multiplexing components to convey power to the plurality of downhole electro-optical interfaces.

14. A method for downhole time domain reflectometry (TDR), comprising:
- deploying a fiber-optic cable in a borehole;
- converting a TDR interrogation signal from an optical signal conveyed by the fiber-optic cable to an electrical signal conveyed by an electrical transmission line in a downhole region of interest with one or more formation fluids that contact the electrical transmission line;
- converting a TDR interrogation response signal from a reflected electrical signal conveyed by the electrical transmission line to a corresponding optical signal conveyed by the fiber-optic cable;
- transmitting the corresponding optical signal to a surface environment;
- converting the corresponding optical signal to a resulting electrical signal;
- analyzing the resulting electrical signal to recover electromagnetic profile information regarding the one or more formation fluids; and
- displaying a result of the analysis.

15. The method of claim 14, wherein said analyzing includes identifying at least one of a water zone, a sand zone, a gas zone, and an oil zone.

16. The method of claim 14, wherein said analyzing includes detecting a characteristic impedance variation in the downhole environment based on the reflected electrical signal, and correlating the detected characteristic impedance variation with at least one of an oil-gas boundary, a water-gas boundary, and a water-oil boundary.

17. The method of claim 14, further comprising conveying power for TDR operations to a plurality of downhole electro-optical interfaces assigned to different downhole zones via an optical fiber arrangement.

18. The method of claim 17, further comprising performing multiplexing operations along the optical fiber arrangement to convey power to the plurality of downhole electro-optical interfaces.

19. A downhole time domain reflectometry (TDR) circuit, comprising:
- a fiber-optic cable deployed in a borehole;
- a light detector between the fiber-optic cable and an electrical transmission line that extends into a downhole region of interest with one or more formation fluids that contact the electrical transmission line; and
- a light source between the fiber-optic cable and the electrical transmission line,
- wherein the light detector is configured to convert a TDR interrogation signal from an optical signal conveyed by the fiber-optic cable to an electrical signal conveyed by the electrical transmission line, and wherein the light source is configured to convert a TDR interrogation response signal that conveys electromagnetic profile information regarding the one or more formation fluids from a reflected electrical signal conveyed by the electrical transmission line to a corresponding optical signal conveyed by the fiber-optic cable.

20. The downhole TDR circuit of claim 19, wherein the electrical transmission line comprises at least two parallel conductor arranged as an open circuit.

21. The downhole TDR circuit of claim 20, wherein a quantity and length of the at least two conductors is predetermined based on a power or signal-to-noise (SNR) criteria.

22. The downhole TDR circuit of claim 19, wherein the TDR interrogation response signal conveys information regarding characteristic impedance variations in the downhole region of interest due to at least one of an oil-gas boundary, a water-gas boundary, and a water-oil boundary.

* * * * *

UNITED STATES PATENT AND TRADEMARK OFFICE
CERTIFICATE OF CORRECTION

PATENT NO. : 9,512,717 B2  
APPLICATION NO. : 13/655607  
DATED : December 6, 2016  
INVENTOR(S) : Neal G. Skinner et al.

Page 1 of 1

It is certified that error appears in the above-identified patent and that said Letters Patent is hereby corrected as shown below:

In the Specification

Column 3, Line 13, the word "all" should read as --an--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*